United States Patent
Ezri et al.

(10) Patent No.: US 9,923,268 B2
(45) Date of Patent: Mar. 20, 2018

(54) BEAMFORMING METHOD AND APPARATUS FOR DIRECTIONAL SIGNAL TRANSMISSION

(71) Applicant: Huawei Technologies Co., Ltd., Shenzhen (CN)

(72) Inventors: Doron Ezri, Munich (DE); Shimi Shilo, Munich (DE); Fuqing Sun, Nanjing (CN); Peng Zhen, Nanjing (CN); Ronghu Fan, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 55 days.

(21) Appl. No.: 14/969,179

(22) Filed: Dec. 15, 2015

(65) Prior Publication Data
US 2016/0099499 A1    Apr. 7, 2016

Related U.S. Application Data

(63) Continuation of application No. PCT/EP2013/077400, filed on Dec. 19, 2013.

(51) Int. Cl.
| | |
|---|---|
| H01Q 3/24 | (2006.01) |
| H04L 12/28 | (2006.01) |
| H01Q 21/00 | (2006.01) |
| H04B 7/06 | (2006.01) |
| H01Q 21/29 | (2006.01) |
| H01Q 25/00 | (2006.01) |

(52) U.S. Cl.
CPC ............ *H01Q 3/24* (2013.01); *H01Q 21/00* (2013.01); *H01Q 21/29* (2013.01); *H01Q 25/00* (2013.01); *H04B 7/0608* (2013.01); *H04B 7/0617* (2013.01); *H04L 12/28* (2013.01); *H04B 7/0639* (2013.01)

(58) Field of Classification Search
USPC ................... 343/876, 893; 342/373; 370/254
See application file for complete search history.

(56) References Cited

U.S. PATENT DOCUMENTS

| | | | | |
|---|---|---|---|---|
| 6,992,621 | B2* | 1/2006 | Casas | H01Q 1/246 |
| | | | | 342/373 |
| 8,116,259 | B2 | 2/2012 | Rofougaran | |
| 2006/0025178 | A1 | 2/2006 | Tao et al. | |
| 2009/0323773 | A1 | 12/2009 | Bala et al. | |
| 2011/0069633 | A1* | 3/2011 | Schmidt | H01Q 1/246 |
| | | | | 370/254 |

(Continued)

FOREIGN PATENT DOCUMENTS

EP        2530848 A2    12/2012

OTHER PUBLICATIONS

"Part 11: Wireless LAN Medium Access Control (MAC) and Physical Layer (PHY) Specifications, Amendment 4: Enhancements for Very High Throughput for Operation in Bands below 6 GHz," IEEE Standards Association, IEEE Std 802.11ac, 2013, 425 pages.

(Continued)

*Primary Examiner* — Jessica Han
*Assistant Examiner* — Hai Tran
(74) *Attorney, Agent, or Firm* — Conley Rose, P.C.

(57) ABSTRACT

A beamforming method and a beamforming apparatus for directional signal transmission are provided, wherein a multiple antenna beamformer is configured to conduct a data transmission to a beamformee.

20 Claims, 3 Drawing Sheets

(56) References Cited

U.S. PATENT DOCUMENTS

2011/0287778 A1* 11/2011 Levin .................... G01S 5/0252
  455/456.1

OTHER PUBLICATIONS

"Part 11: Wireless LAN Medium Access Control (MAC) and Physical Layer (PHY) Specifications, Amendment 5: Enhancements for Higher Throughput," IEEE Computer Society, IEEE Std 802.11n, Oct. 29, 2009, 536 pages.

Foreign Communication From a Counterpart Application, PCT Application No. PCT/EP2013/077400, International Search Report dated Jun. 26, 2014, 4 pages.

Foreign Communication From a Counterpart Application, PCT Application No. PCT/EP2013/077400, Written Opinion dated Jun. 26, 2014, 9 pages.

* cited by examiner

BEAMFORMING METHOD AND APPARATUS FOR DIRECTIONAL SIGNAL TRANSMISSION

CROSS-REFERENCE TO RELATED APPLICATIONS

This application is a continuation of International Application No. PCT/EP2013/077400, filed on Dec. 19, 2013, which is hereby incorporated by reference in its entirety.

TECHNICAL FIELD

The present application relates to the field of beamforming technology in wireless communications, and particularly to a beamforming method for directional signal transmission and to a beamforming apparatus for directional signal transmission, a multiple antenna transmitter, i.e. a beamformer, and to a client/server entity, i.e. a beamformee.

BACKGROUND

Methods and systems for diversity processing based on antenna switching are described in Ahmadreza Rofougaran, " Method and system for diversity processing based on antenna switching," U.S. Pat. No. 8,116,259 dated Feb. 14, 2012. Aspects of one described method include switching among a plurality of antennas in a multi-antenna wireless terminal to receive packets.

An antenna receives a number of packets before switching to another antenna, where the number of packets is predetermined or dynamically determined. According to the described method, the received packets are diversity processed where portions of a plurality of the received packets are combined to form a single data packet. The described method is also be used to transmit packets.

Wireless devices use one or more antennas to receive radio frequency (RF) signals. However, signals received by an antenna may be affected by a transmission path taken by the signals, as well as by characteristics of the receive antenna. For example, the transmission path may comprise obstacles, such as, for example, buildings and/or trees that reflect and/or attenuate transmitted signals. In addition to obstacles in the transmission path, a receive antenna may also not be tuned to receive the frequencies for the desired channel.

Wireless communication and beam forming with passive beamformers are described in Eduardo Casas and Marcus Silva, "Wireless Communication and beam forming with passive beamformers," U.S. Pat. No. 6,992,621. Wireless communication and beamforming is performed by depopulating one or more ports of a passive beamformer such as a Butler matrix and/or by increasing the order thereof. According to a described process, an access station includes a Butler matrix that has multiple antenna ports and multiple ports; a signal processor; and a signal selection device that is capable of coupling the signal processor to a subset of the multiple ports responsive to a signal quality determination, the signal selection device adapted to switch the signal processor from a first port to a second port of the subset of ports.

One beamforming method is digital beamforming which is also supported by the Institute of Electrical and Electronics Engineers (IEEE) 802.11n/ac standards. Multiple fixed beam (usually Omni) antennas are employed. Baseband multiple input and multiple output, and beamforming (standard and beyond, for example, implicit beamforming) techniques are used.

In digital beamforming, the receiver is tuned to coherently combine signals arriving from certain directions. Signals arriving from other directions will not coherently combine and are therefore attenuated. The scheme may be reversed to create directional beams. Thus, digital beamforming is similar to working with adaptive directional antennas.

SUMMARY

It is the object of the disclosure to provide an improved technique for beamforming technology in wireless communications.

This object is achieved by the features of the independent claims. Further implementation forms are apparent from the dependent claims, the description and the figures.

According to a first aspect, a beamforming method for directional signal transmission is provided, wherein a multiple antenna beamformer is configured to conduct a data transmission to a beamformee, the beamforming method comprising selecting a subset of antennas to be used for data transmission out of all multiple antennas of the beamformer; and initializing each antenna of the selected subset of the multiple antennas with a beamforming vector for implicit beamforming.

The basic idea of the present disclosure is a smart combining of antenna switching and implicit digital beamforming to get superior performance. This advantageous solution of the reciprocity problem is based on the acknowledgement signal of wireless local area network systems.

The present disclosure advantageously provides solutions to avoid long training period of the antenna switching making the training period shorter.

In a first possible implementation form of the method according to the first aspect, during a transmission of at least one uplink acknowledgment packet by the beamformee, the selected subset of the multiple antennas is maintained by the beamformer for receiving the uplink acknowledgment.

In a second possible implementation form of the method according to the first implementation form of the first aspect or according to the first aspect as such, different beamforming vectors are selected for different subcarriers or subcarrier groups during the initializing of each antenna.

In a third possible implementation form of the method according to the first aspect as such or according to any of the preceding implementation forms of the first aspect, the beamforming vector comprises data about magnitude and/or phase depending on transfer functions between the antennas of the beamformee and the selected antennas of the beamformer.

In a fourth possible implementation form of the method according to the first aspect as such or according to any of the preceding implementation forms of the first aspect, the beamforming method further comprises the step of evaluating a direction of a movement of the beamformer and/or a speed of the beamformer based on the beamforming vectors.

In a fifth possible implementation form of the method according to the first aspect as such or according to any of the preceding implementation forms of the first aspect, the beamforming method further comprises the step of evaluating a relative position of the beamformee and/or a direction of a movement of the beamformee and/or a speed of the beamformee based on the beamforming vectors.

In a sixth possible implementation form of the method according to the first aspect as such or according to any of the preceding implementation forms of the first aspect, for uplink reception of the signal transmitted by the beamformee and for downlink transmissions of the beamformer an identical selected subset of the multiple antennas is used.

In a seventh possible implementation form of the method according to the first aspect as such or according to any of the preceding implementation forms of the first aspect, the method further comprises the step of determining a first beamforming vector configured to set magnitude and phase of each selected antenna of the multiple antenna beamformer for implicit beamforming based on at least one packet transmitted by the beamformee.

In an eighth possible implementation form of the method according to the first aspect as such or according to any of the preceding implementation forms of the first aspect, the beamforming method further comprises the step of adapting a power angle profile of each antenna of the selected subset of the multiple antennas of the beamformer using the first implicit beamforming vector.

In a ninth possible implementation form of the method according to the eighth possible implementation form of the method, the beamforming method further comprises the step of selecting the subset of the multiple antennas of the beamformer according to the adapted power angle profiles and the first implicit beamforming vector.

According to a second aspect, a beamforming apparatus for directional signal transmission is provided, comprising a beamformer with multiple antennas, which is configured to conduct a data transmission to a beamformee, the beamforming apparatus comprising an antenna switching unit which is designed to select a subset of antennas to be used for data transmission out of all multiple antennas; a baseband processor unit which is designed to determine a beamforming vector configured to calibrate each selected antenna of the beamformer for implicit beamforming based on an uplink transmission by the beamformee and to initialize each antenna of the selected subset of the multiple antennas of the beamformer by the determined beamforming vector and to adapt a power angle profile of each antenna of the selected subset of the multiple antennas; and a control unit which is adapted to use the selected subset of the multiple antennas according to the adapted power angle profiles and employing the beamforming vector to the selected subset.

In a first possible implementation form of the apparatus according to the second aspect, the antenna switching unit is designed to maintain the same beamformer antennas used for downlink transmission, also for the reception of the at least one acknowledgment packet. The implicit beamforming vector can be computed based on said at least one acknowledgment packet.

In a second possible implementation form of the apparatus according to the first implementation form of the second aspect or according to the second aspect as such, different beamforming vectors are selectable for different subcarriers or subcarrier groups during the initializing of each antenna.

In a third possible implementation form of the apparatus according to the second aspect as such or according to any of the preceding implementation forms of the second aspect, the beamforming vector comprises data about magnitude and/or phase of a transfer function between the antennas of the beamformee and the selected antennas of the beamformer.

In a fourth possible implementation form of the apparatus according to the second aspect as such or according to any of the preceding implementation forms of the second aspect, the beamforming apparatus further comprises a receive/transmit (Rx-Tx), calibration unit to maintain channel reciprocity, for example same antennas for uplink and downlink.

In a fifth possible implementation form of the apparatus according to the fourth possible implementation form of the apparatus, the Rx-Tx calibration unit is adapted to calibrate the transmission and reception chains, so that channel reciprocity is maintained.

According to a third aspect, a beamformee is provided, which is configured to conduct a data transmission with a beamformer and which is configured to perform a beamforming method according to the first aspect as such or according to any of the preceding implementation forms of the first aspect.

The methods, apparatuses, systems and devices described herein may be implemented as software in a digital signal processor (DSP) in a micro-controller or in any other side-processor or as hardware circuit within an application specific integrated circuit (ASIC) or in a field-programmable gate array (FPGA), which is an integrated circuit designed to be configured by a customer or a designer after manufacturing—hence field-programmable.

The present disclosure can be implemented in digital electronic circuitry, or in computer hardware, firmware, software, or in combinations thereof, for example in available hardware of conventional mobile devices or in new hardware dedicated for processing the methods described herein.

BRIEF DESCRIPTION OF THE DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DETAILED DESCRIPTION OF EMBODIMENTS OF THE DISCLOSURE

In the figures, identical reference signs denote identical or equivalent elements. In addition, it should be noted that all of the accompanying drawings are not to scale.

The technical solutions in the embodiments of the present disclosure are described clearly and completely in the following with reference to the accompanying drawings in the embodiments of the present disclosure.

The described embodiments are only some embodiments of the present disclosure, rather than all embodiments. Based on the embodiments of the present disclosure, all other embodiments obtained by persons of ordinary skill in the art without making any creative effort shall fall within the protection scope of the present disclosure.

The beamformer may be implemented as a multiple antenna transmitter. The beamformee may be implemented as a client/server entity.

Figure 1:
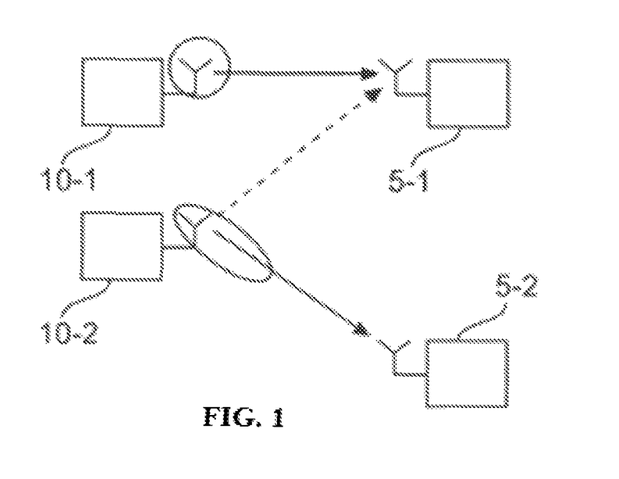
FIG. 1 shows a schematic diagram of two transmitters in form of two access points and two receivers in form of two clients, one transmitter transmitting a directional beam and a second transmitter transmitting a non-directional beam for explaining the disclosure.

FIG. 1 shows a schematic diagram of two transmitters in form of two access points and two receivers in form of two clients, one transmitter transmitting a directional beam and another transmitter transmitting a non-directional beam for explaining the disclosure.

Smart Antenna (SA) and beamforming (BF) technologies play an important role in advanced wireless communication. The concept is to transmit on directional beams pointing at the receiver, rather than omni-directional or non-directional beams, equally distributed in all directions. This is illustrated in FIG. 1, in which a first transmitter 10-1 is an access point (AP) and a first receiver 5-1 is a client. The first transmitter 10-1 transmits a non-directional beam to the first receiver 5-1. A second transmitter 10-2 is an AP and a second receiver 5-2 is a client. The second transmitter 10-2 transmits a directional beam to the second receiver 5-2.

Figure 2:
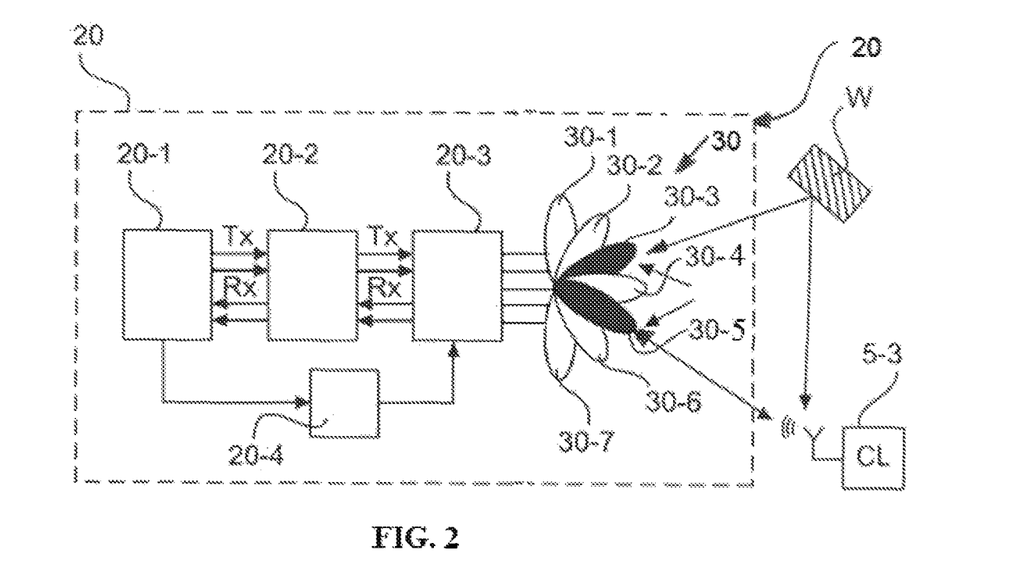
FIG. 2 shows a beamforming apparatus for directional signal transmission according to an embodiment of the disclosure.

FIG. 2 shows a beamforming apparatus for directional signal transmission according to an embodiment of the disclosure.

Optionally, in one embodiment of the present disclosure, a beamforming apparatus 20 for directional signal transmission is provided, wherein a multiple antenna transmitter is configured to conduct a data transmission to a client/server entity, wherein the signal transmission partially is reflected by a wall W. The beamforming apparatus 20 may comprise a baseband processor unit 20-1, an Rx-Tx calibration unit 20-2, an antenna switching unit 20-3, and a control unit 20-4.

The receive/transmit calibration unit 20-2 may be adapted to calibrate the transmission and reception chains to maintain channel reciprocity.

Optionally, in one embodiment of the present disclosure, the baseband processor unit 20-1 may be designed to determine a beamforming vector configured to calibrate each selected antenna of the beamformer for implicit beamforming based on an uplink transmission by the beamformee and to initialize each antenna of the selected subset of the multiple antennas of the beamformer by the determined beamforming vector and to adapt a power angle profile of each antenna of the selected subset of the multiple antennas.

The control unit 20-4 may be adapted to use the selected subset of the multiple antennas according to the adapted power angle profiles and employing the beamforming vector to the selected subset.

Optionally, in one embodiment of the present disclosure, the antenna switching unit 20-3 may be designed to select a subset of antennas to be used for data transmission out of all multiple antennas.

A task in the combining of antenna selection and implicit beamforming is maintaining reciprocity. This is specifically complex in Wi-Fi, in which the beamformer does not generally know which beamformee will transmit the next packet.

In other words, the uplink reception will employ default (for example Omni) antennas to capture signals coming from all possible directions. As the downlink transmission (possibly) uses directional antennas which may be different than the uplink antennas, reciprocity is not maintained, and implicit weight vectors computed on the uplink signal may not be valid for implicit beamforming downlink transmission.

Optionally, in one embodiment of the present disclosure, the usage of uplink acknowledgement packets which are transmitted immediately, actually after a short predefined duration denoted short inter-frame spacing (SIFS), which is the small time interval between the data frame and its acknowledgment, after the downlink transmission advantageously allows smart combining of antenna switching and digital implicit beamforming.

An antenna transmitter unit 30 may comprise multiple antennas 30-1, 30-2, 30-3, 30-4, 30-5, 30-6, and 30-7. According to one embodiment of the disclosure, two antennas may be selected, as indicated in FIG. 2 by the solid black filled beam lobes of the antennas 30-3 and 30-5. However, any number and any combination of antenna could be selected, so the present case of selecting two antennas is an example.

Optionally, in one embodiment of the present disclosure, the beamformer, usually an access point, freezes the directional downlink antennas 30-1, 30-2, 30-3, 30-4, 30-5, 30-6, and 30-7 also for the immediately following uplink acknowledgement packets.

This means that on these uplink acknowledgement packets reciprocity is maintained (same antennas for uplink and downlink) and implicit beamforming vectors computed based on these uplink acknowledgement packets will be valid for downlink transmission.

Optionally, in one embodiment of the present disclosure, the method is accompanied by an Rx-Tx calibration mechanism as in other implicit beamforming systems. Note that for all other uplink packets (besides the acknowledgement) default (usually omni-directional) antennas are used.

Optionally, in one embodiment of the present disclosure, the beamformee 5-3 is configured to conduct a data transmission to a multiple antenna transmitter or beamformer, which may comprise the baseband processor unit 20-1, the receive/transmit, Rx-Tx, calibration unit 20-2, the antenna switching unit 20-3, and the control unit 20-4. In other words, the beamformer is a subunit or a sub-entity or a sub-item of the beamforming apparatus 20.

Figure 3:
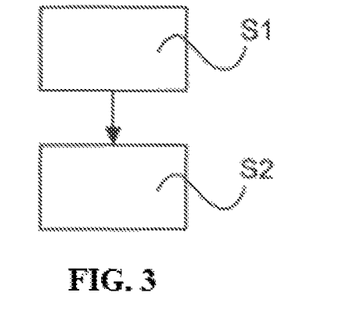
FIG. 3 shows a flowchart diagram of a method for directional signal transmission according to a further embodiment of the disclosure.

FIG. 3 shows a flowchart diagram of a method for directional signal transmission according to a further embodiment of the disclosure.

A beamforming method for directional signal transmission is provided, wherein a beamformer is configured to conduct a data transmission to a beamformee, the beamforming method comprising the following steps.

Selecting S1 a subset of antennas to be used for data transmission out of all multiple antennas of the transmitter is performed.

Initializing S2 each antenna of the selected subset of the multiple antennas of the beamformer with a beamforming vector for implicit beamforming is conducted.

Figure 4:
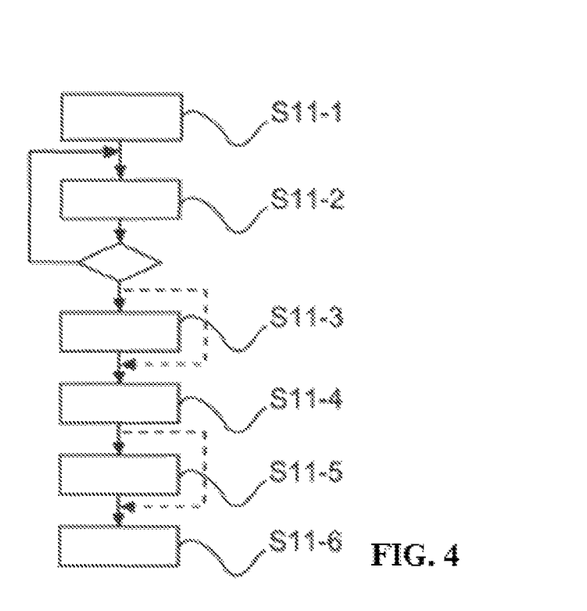
FIG. 4 shows a flowchart diagram of a method for directional signal transmission according to a further embodiment of the disclosure.

FIG. 4 shows a flowchart diagram of a method for directional signal transmission according to a further embodiment of the disclosure.

A beamforming method for directional signal transmission is provided, wherein a multiple antenna beamformer is configured to conduct a data transmission to a beamformee, the beamforming method comprising the following steps.

In a step of the method for directional signal transmission, an initializing S11-1 of the apparatus is performed.

In a further step of the method for directional signal transmission, employing S11-2 implicit beamforming on initial or predetermined antennas is conducted.

Subsequently, a change in consecutive beamforming vectors is evaluated, for instance, by comparing a measured value with a threshold value.

If a change is detected, the apparatus performs a dynamic mode and continues with step S11-2. If no change is detected, the apparatus performs a static mode and continues with step S11-3.

In a further step of the method for directional signal transmission, using S11-3 implicit beamforming vectors to initialize an antenna selection is conducted.

In a further step of the method for directional signal transmission, selecting S11-4 an antenna selection is conducted.

In a further step of the method for directional signal transmission, updating S11-5 power angle profiles of the antenna selection is conducted.

In a further step of the method for directional signal transmission, employing S11-6 implicit beamforming on the antenna selection is conducted.

Figure 5:
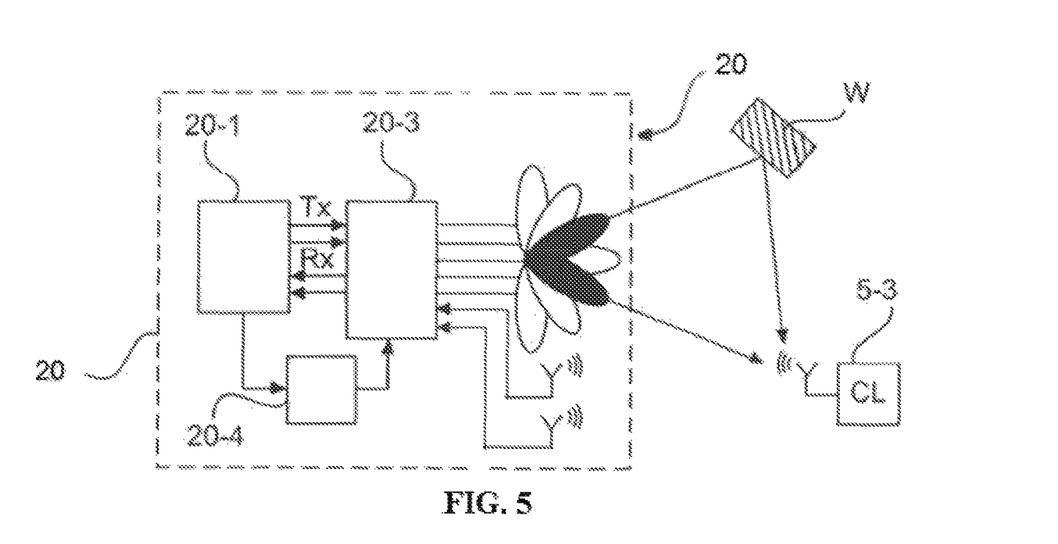
FIG. 5 shows a beamforming apparatus for directional signal transmission according to a further embodiment of the disclosure.

FIG. 5 shows a beamforming apparatus for directional signal transmission according to a further embodiment of the disclosure.

The multiple antenna beamformer as shown in FIG. 5 uses directional antennas for a downlink transmission to the beamformee 5-3. The active antennas are indicated by solid black filled areas.

The further elements shown in FIG. 5 were already described in the figure description corresponding to FIG. 2 and are, therefore, in order to avoid repetition, not explained in this part again.

Figure 6:
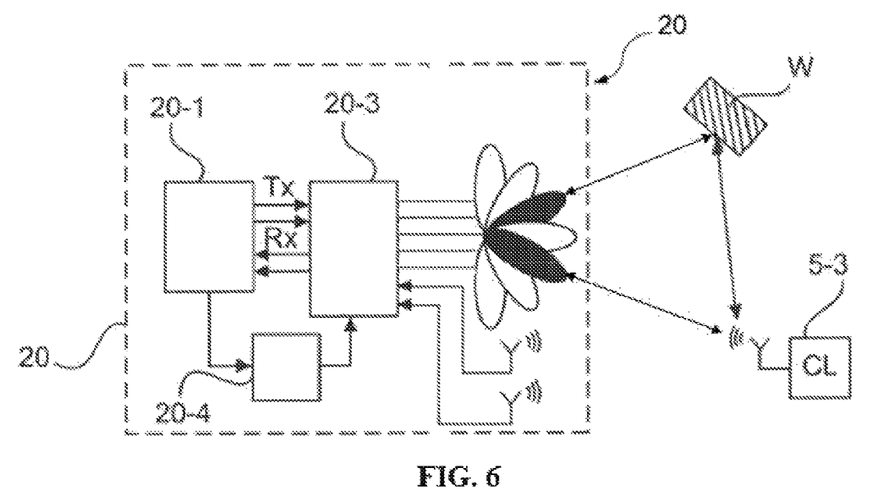
FIG. 6 shows a beamforming apparatus for directional signal transmission according to a further embodiment of the disclosure.

FIG. 6 shows a beamforming apparatus for directional signal transmission according to a further embodiment of the disclosure. The arrows indicate the bi-directional data transmission, i.e. transmission and reception.

The multiple antenna beamformer, as shown in FIG. 6, uses the same directional antennas for a downlink transmission to Beamformee 5-3 and uplink acknowledgment transmission by Beamformee 5-3. The selected antennas are indicated by solid black filled areas.

The further elements shown in FIG. 6 were already described in the figure description corresponding to FIG. 2 and are, therefore, in order to avoid repetition, not explained in this part again.

Figure 7:
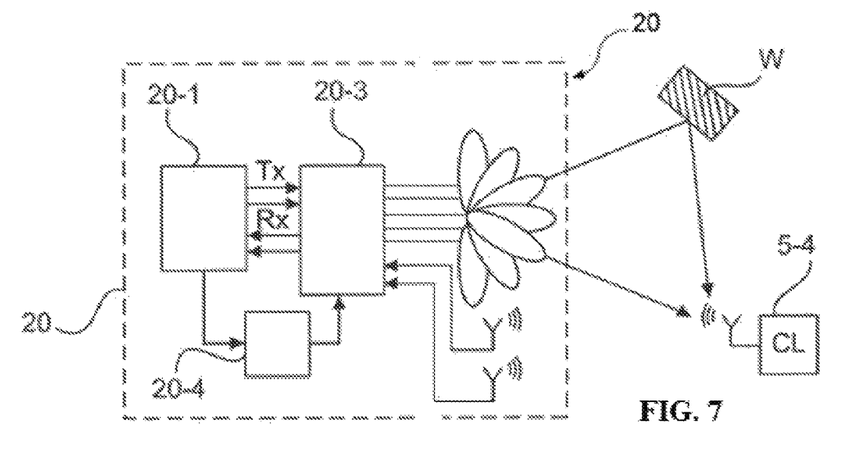
FIG. 7 shows a beamforming apparatus for directional signal transmission according to a further embodiment of the disclosure.

FIG. 7 shows a beamforming apparatus for directional downlink signal transmission according to a further embodiment of the disclosure.

The multiple antenna beamformer, as shown in FIG. 7, uses default directional antennas, particularly illustrated in the FIG. 7 by the two antennas on the bottom, and the default directional antennas are provided for uplink reception of signals emitted by the beamformee 5-4.

The further elements shown in FIG. 7 were already described in the corresponding figure description of FIG. 2 are therefore not explained again in order to avoid repetition.

The present disclosure also supports a computer program product including computer executable code or computer executable instructions that, when executed, causes at least one computer to execute the performing and computing steps described herein.

Many alternatives, modifications, and variations will be apparent to those skilled in the art in light of the above teachings. Of course, those skilled in the art readily recognize that there are numerous applications of the disclosure beyond those described herein.

While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosures may be practiced otherwise than as specifically described herein.

In the claims, the word "comprising" does not exclude other elements or steps, and the indefinite article "a" or "an" does not exclude a plurality. A single processor or other unit may fulfill the functions of several items recited in the claims.

The mere fact that certain measures are recited in mutually different dependent claims does not indicate that a combination of these measured cannot be used to advantage.

A computer program may be stored or distributed on a suitable medium, such as an optical storage medium or a solid-state medium supplied together with or as part of other hardware, but may also be distributed in other forms, such as via the Internet or other wired or wireless telecommunication systems.

What is claimed is:

1. A beamforming method for directional signal transmission, wherein a beamformer comprising a plurality of antennas is configured to conduct a data transmission to a bearnformee, the beamforming method comprising:
    initializing each antenna of the plurality of antennas with a beamforming vector for implicit beamforming;
    adapting a power angle profile of each antenna of the plurality of antennas; and
    selecting a subset of antennas according to the power angle profile and the beamforming vector for implicit beamforming.

2. The beatmforming method according to claim 1, wherein during a transmission of at least one uplink acknowledgment packet the subset of antennas is maintained.

3. The beamforming method according to claim 1, wherein different beamforming vectors are selected for different subcarriers during the initializing of each antenna.

4. The beamforming method according to claim 1, wherein different beamforming vectors are selected for different subcarrier groups during the initializing of each antenna.

5. The beamforming method according to claim 1, wherein each of the beamforming vector comprises data about at least one of magnitude and phase depending on transfer functions between the antennas of the beamformee and the subset of antennas of the beamformer.

6. The beamforming method according to claim 1, wherein the beamforming method further comprises evaluating a direction of a movement of the beamformer.

7. The beamforming method according to claim 1, wherein the beamforming method further comprises evaluating a relative position of the beamformee.

8. The beamforming method according to claim 1, wherein the subset of the antennas of the beamformer is used for uplink reception of a signal transmitted by the beamformee and for downlink transmissions of the beamformer.

9. The beamforming method according to claim 1, wherein the method further comprises determining a first beamforming vector configured to set magnitude and phase of each selected antenna of the beamfomer fair implicit beamforming based on at least one packet transmitted by the beamformee.

10. The beamforming method according to claim 9, wherein the beamforming method further comprises adapting a power angle profile of each antenna of the subset of antennas of the beamformer using an implicit beamforming vector.

11. The beamforming method according to claim 1, wherein the beamforming method further comprises evaluating a speed of beamformer based on the beamforming vectors.

12. The beamforming method according to claim 1, wherein the beamforming method further comprises evaluating a direction of a movement of the beamformer and a speed of beamformer based on the beamforming vectors.

13. The beamforming method according to claim 1, wherein the beamforming method farther comprises evaluating a relative position of the beamformee, a direction of a movement of the beamformee, and a speed of the beamfomee based on the beamforming vectors.

14. A beamforming apparatus for directional signal transmission, the beamforming apparatus comprising;
an antenna switch designed to select a subset of antennas from a plurality of antennas coupled to the antenna switch, wherein the subset of antennas is used for data transmission;
a baseband processor configared to:
determine a beam forming vector;
calibrate each selected antenna for implicit beamforming based on an uplink transmission by a bearnformee;
initialize each antenna of the selected subset of antennas of the beamformer by the beamforming vector; and
adapt a power angle profile of each antenna of the subset of antennas; and
a controller coupled to the antenna switch and the baseband processor wherein the controller is configured to:
use the subset of antennas according to the adapted power angle profiles and the beamforming vector; and
employ the beamforming vector to the subset of antennas.

15. The beamforming apparatus according to claim 14, wherein the antenna switch is further designed to maintain the beamformer antennas selected for downlink transmission and reception of the at least one acknowledgment packet.

16. The beamforming apparatus according to claim 14. wherein different beamforming vectors are selectable for different subcarriers during the initializing of each antenna.

17. The beamforming apparatus according to claim 14, wherein different beamforming vectors are selectable for different subcarrier groups during the initializing of each antenna.

18. The beamforming apparatus according to claim 14, wherein the beamforming vector comprises data about at least one of magnitude and phase depending on transfer functions between the antennas of the beamformee and the selected subset of antennas of the beamfomer.

19. A beamformee configured to conduct a data transmission to a beamformer, wherein the beamformer comprises a plurality of antennas and is configured to:
initialize each antenna of the plurality of antennas with a beamforming vector for implicit beamfoiming,
adapt a power angle profile of each antenna of the plurality of antennas and
select a subset of antennas according to the power angle profile and the beamforming n vector for implicit beamforming.

20. The beamfotmee according to claim 19, wherein the beamformer is further configured to evaluate a relative position of the beamformee, a direction of a movement of the beamformee, and a speed of the beamformee based on the beamforming vectors.

* * * * *

UNITED STATES PATENT AND TRADEMARK OFFICE
CERTIFICATE OF CORRECTION

PATENT NO. : 9,923,268 B2  
APPLICATION NO. : 14/969179  
DATED : March 20, 2018  
INVENTOR(S) : Doron Ezri et al.

Page 1 of 2

It is certified that error appears in the above-identified patent and that said Letters Patent is hereby corrected as shown below:

In the Claims

Column 8; Line 30; Claim 1 should read:  
antennas is configured to conduct a data transmission to a beamformee Column 8; Line 39; Claim 2 should read:  
The beamforming method according to claim 1, Column 8; Line 51; Claim 5 should read:  
wherein each of the beamforming vectors comprises data Column 9; Line 1; Claim 9 should read:  
of each selected antenna of the beamformer for implicit Column 9; Line 18; Claim 13 should read:  
wherein the beamforming method further comprises evaluating Column 9; Line 28; Claim 14 should read:  
a baseband processor configured to:

Column 9; Line 29; Claim 14 should read:  
determine a beamforming vector;

Column 9; Line 31; Claim 14 should read:  
beamforming based on an uplink transmission by a beamformee;

Column 10; Line 27; Claim 19 should read:  
beamforming vector for implicit beamforming, Signed and Sealed this  
Twenty-fourth Day of April, 2018

Andrei Iancu  
*Director of the United States Patent and Trademark Office*

CERTIFICATE OF CORRECTION (continued)
U.S. Pat. No. 9,923,268 B2

Column 10; Line 29; Claim 19 should read:
plurality of antennas; and

Column 10; Line 31; Claim 19 should read:
profile and the beamforming vector for implicit Column 10; Line 32; Claim 20 should read:
The beamformee according to claim 19, wherein the